United States Patent
Reddy et al.

(10) Patent No.: US 11,302,971 B1
(45) Date of Patent: Apr. 12, 2022

(54) SYSTEM AND METHOD OF UTILIZING A RECHARGEABLE BATTERY WITH AN INFORMATION HANDLING SYSTEM

(71) Applicant: Dell Products L.P., Round Rock, TX (US)

(72) Inventors: Karunakar Palicherla Reddy, Austin, TX (US); Richard Christopher Thompson, Cedar Park, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 17/026,709

(22) Filed: Sep. 21, 2020

(51) Int. Cl.
*H01M 10/44* (2006.01)
*H01M 10/48* (2006.01)
*H02J 7/00* (2006.01)

(52) U.S. Cl.
CPC ........... *H01M 10/44* (2013.01); *H01M 10/48* (2013.01); *H02J 7/0031* (2013.01)

(58) Field of Classification Search
CPC ....... H01M 10/44; H01M 10/48; H02J 7/0031
USPC ........................................................ 320/134
See application file for complete search history.

(56) References Cited

U.S. PATENT DOCUMENTS

| | | | | |
|---|---|---|---|---|
| 7,826,189 B1 * | 11/2010 | Edwards | ............... | H01M 10/48 |
| | | | | 361/86 |
| 2002/0098410 A1 * | 7/2002 | Leysieffer | ........... | H01M 50/581 |
| | | | | 429/61 |
| 2005/0134232 A1 * | 6/2005 | Yamamoto | ............ | H02J 7/0031 |
| | | | | 320/150 |

OTHER PUBLICATIONS

Chen, Xiyuan, et al. "Characterization of distributed microfabricated strain gauges on stretchable sensor networks for structural applications." *Sensors* 18.10 (2018): 3260.

Büscher, Gereon H., et al. "Flexible and stretchable fabric-based tactile sensor." *Robotics and Autonomous Systems* 63 (2015): 244-252.

\* cited by examiner

*Primary Examiner* — Nathaniel R Pelton
(74) *Attorney, Agent, or Firm* — Baker Botts L.L.P.

(57) ABSTRACT

In one or more embodiments, one or more systems, one or more methods, and/or one or more processes may determine first multiple impedance values of respective multiple resistors associated with a barrier of an enclosure of a cell of a rechargeable battery that includes multiple cells; determine second multiple impedance values of the respective multiple resistors; determine multiple impedance value changes of the respective multiple resistors based at least on the first multiple impedance values and the second multiple impedance values; determine that at least a portion of the multiple impedance value changes exceed a threshold impedance value change; determine that the cell is compromised based at least on determining that the at least the portion of the multiple impedance value changes exceed the threshold impedance value change; and in response to determining that the cell is compromised, remove the cell from a topology of the rechargeable battery.

20 Claims, 15 Drawing Sheets

SYSTEM AND METHOD OF UTILIZING A RECHARGEABLE BATTERY WITH AN INFORMATION HANDLING SYSTEM

BACKGROUND

Field of the Disclosure

This disclosure relates generally to information handling systems and more particularly to utilizing a rechargeable batteries with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine first multiple impedance values of respective first multiple resistors associated with a first barrier of an enclosure of a cell of multiple cells of a rechargeable battery; may determine second multiple impedance values of the respective first multiple resistors; may determine first multiple impedance value changes of the respective first multiple resistors based at least on the first multiple impedance values and the second multiple impedance values; may determine that at least a portion of the first multiple impedance value changes exceed a threshold impedance value change; may determine that the cell is compromised based at least on determining that the at least the portion of the first multiple impedance value changes exceed the threshold impedance value change; and in response to determining that the cell is compromised, may remove the cell from a topology of the rechargeable battery.

In one or more embodiments, the one or more systems, the one or more methods, and/or the one or more processes may further: determine third multiple impedance values of respective second multiple resistors associated with a second barrier of the enclosure of the cell; determine fourth multiple impedance values of the respective second multiple resistors; determine second multiple impedance value changes of the respective second multiple resistors based at least on the third multiple impedance values and the fourth multiple impedance values; and determine that at least a portion of the second multiple impedance value changes exceed the threshold impedance value change. For example, determining that the cell is compromised may be further based at least on the determining that the at least the portion of the second multiple impedance value changes exceed the threshold impedance value change.

In one or more embodiments, each of at least two resistors of the first multiple resistors may include a resistive fabric that changes impedance when elongated along an axis. In one or more embodiments, removing the cell from the topology of the rechargeable battery may include reconfiguring the topology of the rechargeable battery to bypass utilizing the cell. In one or more embodiments, the one or more systems, the one or more methods, and/or the one or more processes may further, in response to determining that the cell is compromised, remove at least one other cell of the multiple cells from the topology of the rechargeable battery.

In one or more embodiments, the one or more systems, the one or more methods, and/or the one or more processes may further, after removing the cell from the topology of the rechargeable battery, charge balance other cells of the multiple cells. In one or more embodiments, determining the first multiple impedance values may include converting, by at least one analog to digital converter, first multiple analog signals respectively associated with the first multiple resistors into first digital data that include the first multiple impedance values. In one or more embodiments, determining the second multiple impedance values may include converting, by the at least one analog to digital converter, second multiple analog signals respectively associated with the first multiple resistors into second digital data that include the second multiple impedance values. In one or more embodiments, determining the first multiple impedance value changes may include comparing the first digital data with the second digital data.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
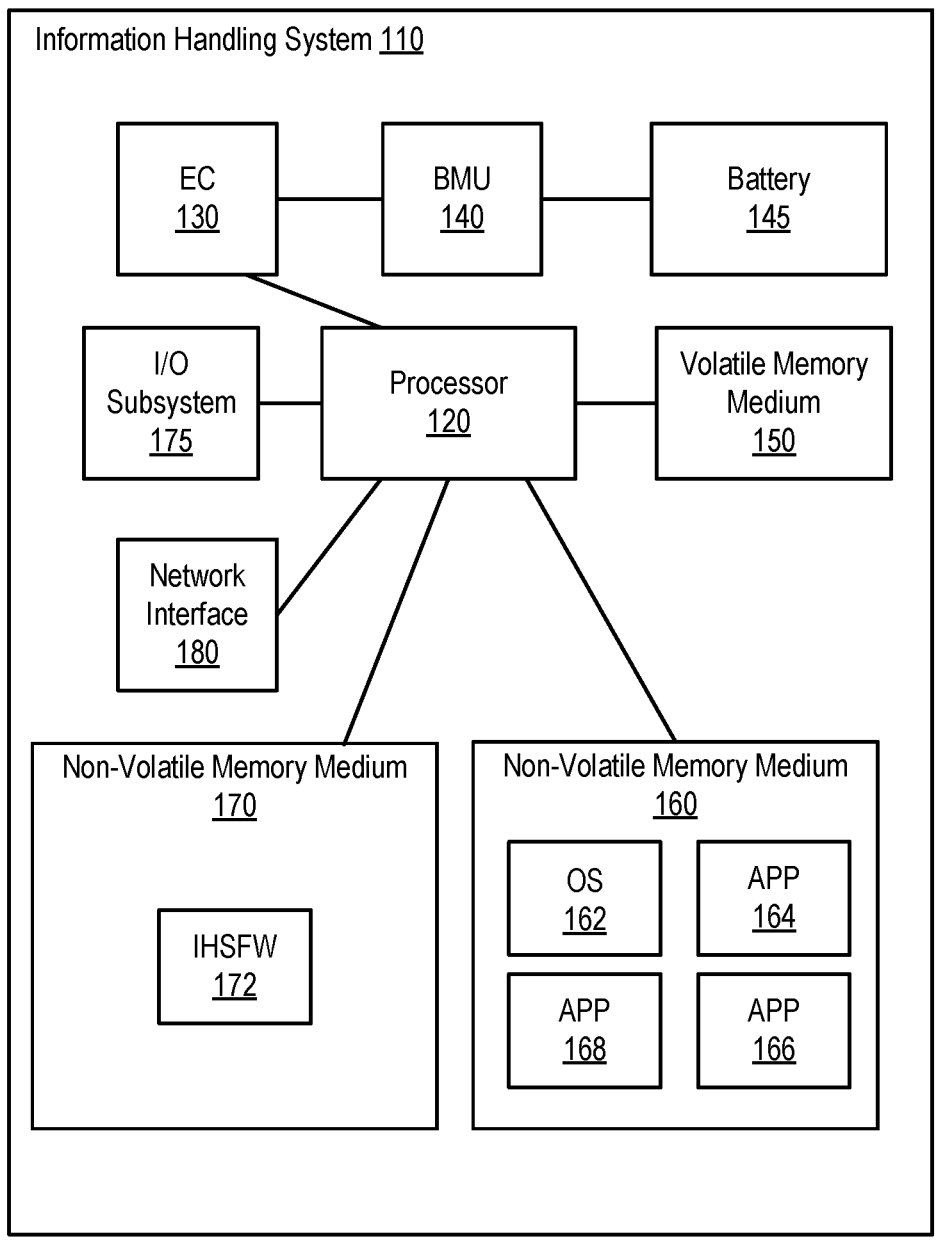
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may include one or more rechargeable batteries. For example, the one or more rechargeable batteries may provide electrical power to one or more components of the information handling system. Swelling of a rechargeable battery can be an issue. In one example, the rechargeable battery may generate gas as it charges and/or as it discharges, and the gas may not be able to be expelled via an enclosure of the rechargeable battery. For instance, if the rechargeable battery may not be able to expel the gas via the enclosure of the rechargeable battery, the rechargeable battery may increase in volume when the rechargeable battery is charged and/or discharged. In another example, an electrode and/or an anode of a rechargeable cell of the rechargeable battery may increase in volume as the rechargeable cell charges and/or as it discharges. For instance, if the electrode and/or the anode of the rechargeable cell increases in volume, the rechargeable cell may increase in volume, which may cause the rechargeable battery to increase in volume. If the rechargeable battery is placed in a volume of an information handling system and if the rechargeable battery swells (e.g., increases in volume), one or more portions of the information handling system may be damaged or may be ruined.

In one or more embodiments, adjusting a charge rate of the rechargeable battery and/or adjusting a discharge rate of the rechargeable battery may limit swelling (e.g., expanding in volume) of the rechargeable battery. For example, one or more strain gauges may be placed in contact with the rechargeable battery. Based at least on measurements from the one or more strain gauges, a discharge rate of the rechargeable battery may be adjusted and/or a charge rate of the rechargeable battery may be adjusted to reduce and/or mitigate swelling of the rechargeable battery beyond a threshold volume. In one instance, adjusting a discharge rate of the rechargeable battery may include reducing the discharge rate of the rechargeable battery. In another instance, adjusting a charge rate of the rechargeable battery may include reducing the charge rate of the rechargeable battery.

In one or more embodiments, the rechargeable battery may include multiple rechargeable cells. For example, one or more strain gauges may be placed in contact with the multiple rechargeable cells of the rechargeable battery. Based at least on measurements from the one or more strain gauges, a discharge rate of a rechargeable cell of the multiple rechargeable cells may be adjusted and/or a charge rate of a rechargeable cell of the multiple rechargeable cells to reduce and/or mitigate swelling of the rechargeable battery beyond a threshold volume. In one instance, adjusting a discharge rate of the rechargeable cell of the multiple rechargeable cells may include reducing the discharge rate of the rechargeable cell of the multiple rechargeable cells. In another instance, adjusting a charge rate of the rechargeable cell of the multiple rechargeable cells may include reducing the charge rate of the rechargeable cell of the multiple rechargeable cells.

As one example, a battery management unit (BMU) associated with the rechargeable battery may utilize one or more measurements from the one or more strain gauges and adjust the discharge rate of the rechargeable cell of the multiple rechargeable cells based at least on the one or more measurements from the one or more strain gauges. As another example, the BMU associated with the rechargeable battery may utilize one or more measurements from the one or more strain gauges and adjust the charge rate of the rechargeable cell of the multiple rechargeable cells based at least on the one or more measurements from the one or more strain gauges.

In one or more embodiments, multiple strain gauges may be in contact with a rechargeable cell of the rechargeable battery at multiple physical locations associated with a surface of an enclosure of the rechargeable cell. In one example, a physical change of an anode of the rechargeable cell may be determined based at least on measurements from the multiple strain gauges. For instance, plating of the anode may be detected based at least on the measurements from the multiple strain gauges. In another example, a physical change of a cathode of the rechargeable cell may be determined based at least on measurements from the multiple strain gauges.

As discussed above, adjusting a charge rate of the rechargeable battery and/or adjusting a discharge rate of the rechargeable battery may limit swelling (e.g., expanding in volume) of the rechargeable battery. For example, one or more resistors may be placed in contact with the rechargeable battery. For instance, an impedance of a resistor of the one or more resistors in contact with the rechargeable battery may change if a surface of the rechargeable battery changes. Based at least on impedance measurements from the one or more resistors, a discharge rate of the rechargeable battery may be adjusted and/or a charge rate of the rechargeable battery may be adjusted to reduce and/or mitigate swelling of the rechargeable battery beyond a threshold volume. In one instance, adjusting a discharge rate of the rechargeable battery may include reducing the discharge rate of the rechargeable battery. In another instance, adjusting a charge rate of the rechargeable battery may include reducing the charge rate of the rechargeable battery.

In one or more embodiments, the rechargeable battery may include multiple rechargeable cells. For example, one or more resistors may be placed in contact with the multiple rechargeable cells of the rechargeable battery. Based at least on measurements (e.g., impedance measurements) from the one or more resistors, a discharge rate of a rechargeable cell of the multiple rechargeable cells may be adjusted and/or a charge rate of a rechargeable cell of the multiple rechargeable cells to reduce and/or mitigate swelling of the rechargeable battery beyond a threshold volume. In one instance, adjusting a discharge rate of the rechargeable cell of the multiple rechargeable cells may include reducing the discharge rate of the rechargeable cell of the multiple rechargeable cells. In another instance, adjusting a charge rate of the rechargeable cell of the multiple rechargeable cells may include reducing the charge rate of the rechargeable cell of the multiple rechargeable cells.

As one example, the BMU associated with the rechargeable battery may utilize one or more measurements (e.g., one or more impedance measurements) from the one or more resistors and adjust the discharge rate of the rechargeable cell of the multiple rechargeable cells based at least on the one or more measurements from the one or more resistors. As another example, the BMU associated with the rechargeable battery may utilize one or more measurements from the one or more resistors and adjust the charge rate of the rechargeable cell of the multiple rechargeable cells based at least on the one or more measurements from the one or more resistors.

In one or more embodiments, multiple resistors may be in contact with a rechargeable cell of the rechargeable battery at multiple physical locations associated with a surface of an enclosure of the rechargeable cell. In one example, a physical change of an anode of the rechargeable cell may be determined based at least on measurements (e.g., impedance measurements) from the multiple resistors. For instance, plating of the anode may be detected based at least on the measurements from the multiple resistors. In another example, a physical change of a cathode of the rechargeable cell may be determined based at least on measurements from the multiple resistors.

In one or more embodiments, a resistor may include a resistive fabric that changes impedance when elongated along an axis. For example, a resistor may include a piezoresistive fabric. For instance, when the resistive fabric is stretched (e.g., elongated), an impedance value associated with the resistive fabric may change. As an example, the resistive fabric may be associated with a first impedance value, and when the resistive fabric is stretched (e.g., elongated), the resistive fabric may be associated with a second impedance value, different from the first impedance value.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, an embedded controller (EC) 130, a BMU 140, a battery 145, a volatile memory medium 150, non-volatile memory media 160 and 170, an I/O subsystem 175, and a network interface 180. As illustrated, EC 130, volatile memory medium 150, non-volatile memory media 160 and 170, I/O subsystem 175, and network interface 180 may be communicatively coupled to processor 120. As shown, BMU 140 may be coupled to EC 130. For example, BMU 140 may be coupled to EC 130 via a bus described herein. As illustrated, battery 145 may be coupled to BMU 140. For example, BMU 140 may control one or more portions of battery 145. In one or more embodiments, battery 145 may provide electrical power to one or more components of IHS 110. For example, the one or more components of IHS 110 may include one or more of processor 120, EC 130, BMU 140, volatile memory medium 150, non-volatile memory media 160 and 170, I/O subsystem 175, and network interface 180, among others. Although BMU 140 is illustrated as external to battery 145, battery 145 may include BMU 140, according to one or more embodiments. For example, BMU 140 may be external to battery 145, or battery 145 may include BMU 140.

In one or more embodiments, one or more of EC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of EC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of EC 130, I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, EC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 130 may be or include an application processor. In one example, EC 130 may be or include an ARM Cortex-A processor. In another example, EC 130 may be or include an Intel Atom processor. In one or more embodiments, EC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, BMU 140 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMU 140 may be or include one or more of a FPGA and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 2:
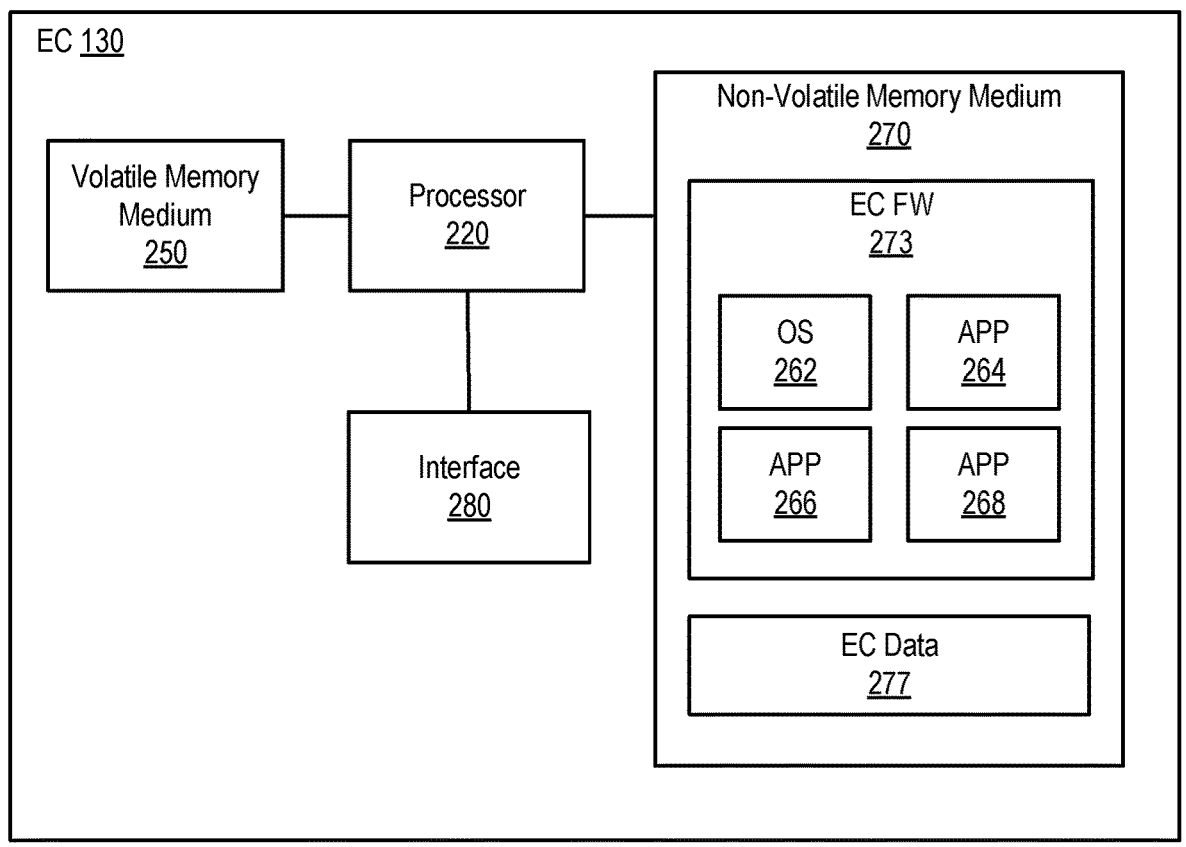
FIG. 2 illustrates an example of an embedded controller, according to one or more embodiments.

Turning now to FIG. 2, an example of an embedded controller is illustrated, according to one or more embodiments. As shown, EC 130 may include a processor 220, a volatile memory medium 250, a non-volatile memory medium 270, and an interface 280. As illustrated, non-volatile memory medium 270 may include a EC firmware (FW) 273, which may include an OS 262 and APPs 264-268, and may include EC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more devices. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 130 to provide and/or receive signals associated with other circuitry. In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Figure 3:
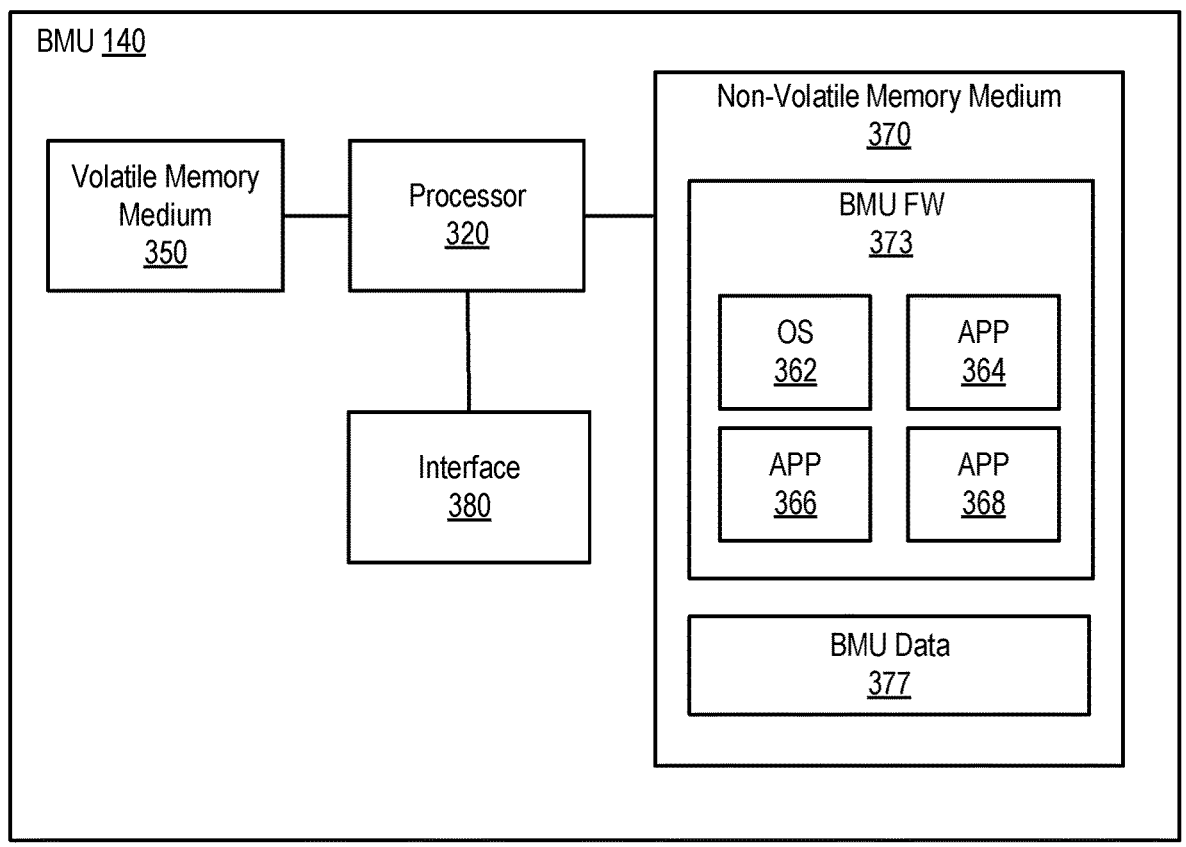
FIG. 3 illustrates an example of a battery management unit, according to one or more embodiments.

Turning now to FIG. 3, an example of a battery management unit is illustrated, according to one or more embodiments. As shown, BMU 140 may include a processor 320, a volatile memory medium 350, a non-volatile memory medium 370, and an interface 380. As illustrated, non-volatile memory medium 370 may include a BMU FW 373, which may include an OS 362 and APPs 364-368, and may include BMU data 377. In one example, OS 362 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In another example, OS 362 may be or include a POSIX compliant operating system.

In one or more embodiments, interface 380 may include circuitry that enables communicatively coupling to one or more devices. In one example, interface 380 may include circuitry that enables communicatively coupling to one or more buses. For instance, the one or more buses may include one or more buses described herein, among others. In a second example, interface 380 may include circuitry that enables one or more interrupt signals to be received. In one instance, interface 380 may include GPIO circuitry, and the GPIO circuitry may enable one or more interrupt signals to be received and/or provided via at least one interrupt line. In another instance, interface 380 may include GPIO circuitry that may enable BMU 140 to provide and/or receive signals associated with other circuitry. In another example, interface 380 may include circuitry that enables communicatively coupling to one or more analog to digital converters. For instance, BMU 140 may receive digital data from the one or more analog to digital converters via interface 380.

In one or more embodiments, one or more of OS 362 and APPs 364-368 may include processor instructions executable by processor 320. In one example, processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and processor 320 may execute the one or more portions of the processor instructions of the one or more of OS 362 and APPs 364-368 via volatile memory medium 350. In one or more embodiments, processor 320 may execute instructions in accordance with at least a portion of one or more systems, at least a portion of one or more flowcharts, one or more methods, and/or at least a portion of one or more processes described herein. For example, non-volatile memory medium 370 and/or volatile memory medium 350 may store instructions that may be executable in accordance with at least a portion of one or more systems, at least a portion of one or more flowcharts, at least a portion of one or more methods, and/or at least a portion of one or more processes described herein. In one or more embodiments, processor 320 may execute instructions in accordance with at least a portion of one or more of systems, flowcharts, at least a portion of one or more methods, and/or at least a portion of one or more processes described herein. For example, non-volatile memory medium 370 and/or volatile memory medium 350 may store instructions that may be executable in accordance with at least a portion of one or more of systems, at least a portion of one or more flowcharts, at least a portion of one or more methods, and/or at least a portion of one or more processes described herein. In one or more embodiments, processor 320 may utilize BMU data 377. In one example, processor 320 may utilize BMU data 377 via non-volatile memory medium 370. In another example, one or more portions of BMU data 377 may be transferred to volatile memory medium 350, and processor 320 may utilize BMU data 377 via volatile memory medium 350.

Figure 4A:
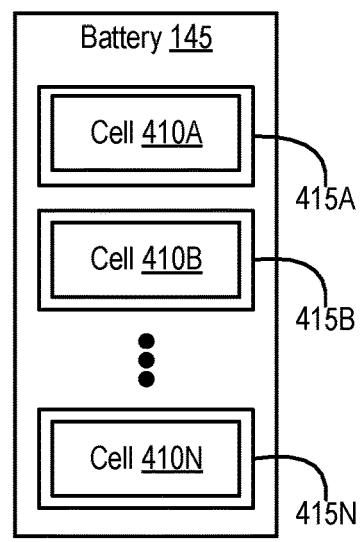
FIG. 4A illustrates an example of a rechargeable battery, according to one or more embodiments.

Turning now to FIG. 4A, an example of a rechargeable battery is illustrated, according to one or more embodiments. As shown, battery 145 may include cells 410A-410N. In one or more embodiments, battery 145 may include any number of cells 410. In one or more embodiments, a cell 410 may be enclosed by an enclosure 415. As illustrated, cells 410A-410N may be respectively enclosed by enclosures 415A-415N.

Figure 4B:
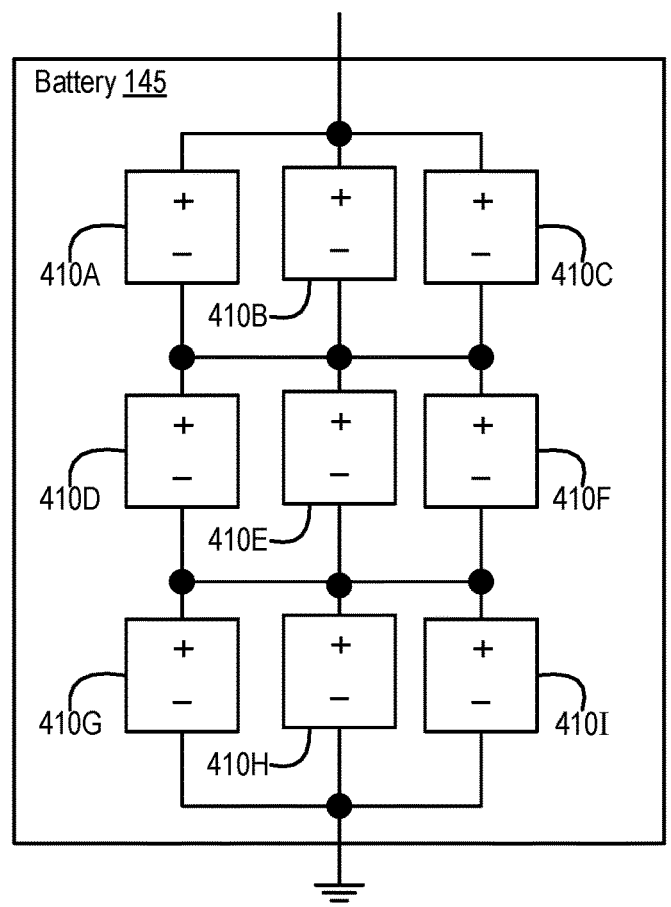
FIG. 4B illustrates an example of an arrangement of cells of a rechargeable battery, according to one or more embodiments.

Turning now to FIG. 4B, an example of an arrangement of cells of a rechargeable battery is illustrated, according to one or more embodiments. As shown, cells 410A-410C may be coupled in parallel. As illustrated, cells 410D-410F may be coupled in parallel. As shown, cells 410G-410I may be coupled in parallel. As illustrated, cells 410A-410C may be coupled in series to cells 410D-410F. As shown, cells 410D-410F may be coupled in series to cells 410G-410I. For example, battery 145 may include a three series, three parallel (3S3P) topology.

Figure 4D:
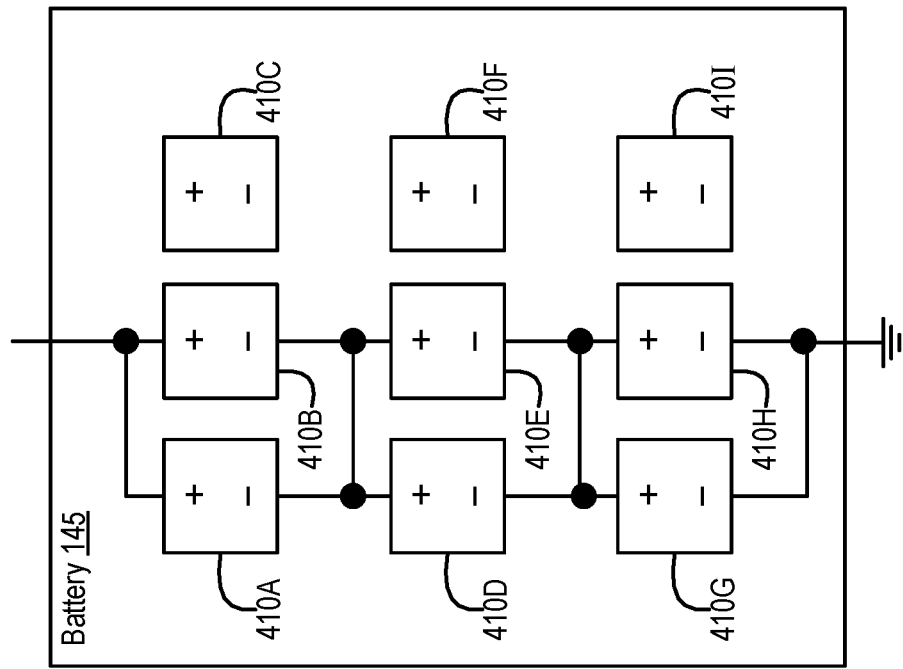
FIG. 4D illustrates an example of a removal of multiple cells from a topology of a rechargeable battery, according to one or more embodiments.
Figure 4C:
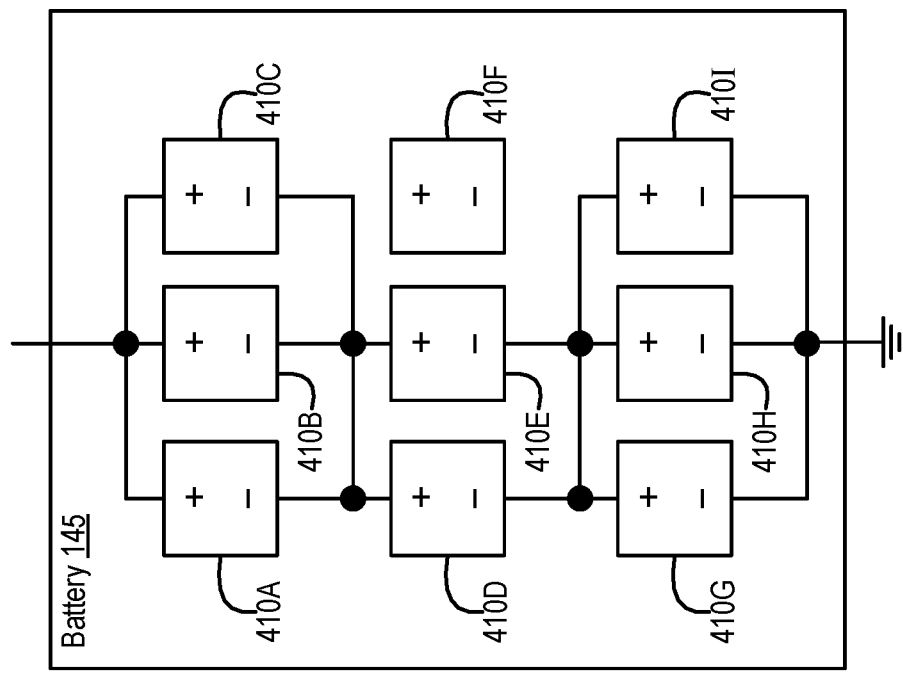
FIG. 4C illustrates an example of a removal of a cell from a topology of a rechargeable battery, according to one or more embodiments.

Turning now to FIG. 4C, an example of a removal of a cell from a topology of a rechargeable battery is illustrated, according to one or more embodiments. As shown, cell 410F may be removed from a topology of battery 145. For example, cell 410F may be removed from a topology of battery 145 due to an issue or a problem associated with cell 110F. In one instance, the issue or the problem associated with cell 110F may have been determined via determining that enclosure 415F has swollen. In another instance, the issue or the problem associated with cell 110F may have been determined via determining that enclosure 415F has increased in volume.

Turning now to FIG. 4D, an example of a removal of multiple cells from a topology of a rechargeable battery is illustrated, according to one or more embodiments. As shown, cells 410C, 410F, and 410I may be removed from a topology of battery 145. For example, cell 410F may be removed from a topology of battery 145 due to an issue or a problem associated with cell 110F. For instance, battery 145 may not be able to operate properly if only cell 410F is removed from the topology of battery 145. In one or more embodiments, if cell 410F is removed from the topology of battery 145, cells 410C and 410I may be removed from the topology of battery 145, as well. For example, after removing cells 410C, 410F, and 410I from the topology of battery 145, the topology of battery 145 may become a three series, two parallel (3S2P) topology. Although 410C and 410I are shown to be removed, one of cells 410A and 410B may be removed from the topology of battery 145 instead of cell 410C, or one of cells 410G and 410H may be removed from the topology of battery 145 instead of cell 410I, according to one or more embodiments. For example, cell 410A may be a better candidate for removal than cell 410C. For instance, it may be determined that cell 410C is in a better operational state than cell 410A, and cell 10A may be removed from the topology of battery 145 instead of cell 410C.

Figure 4E:
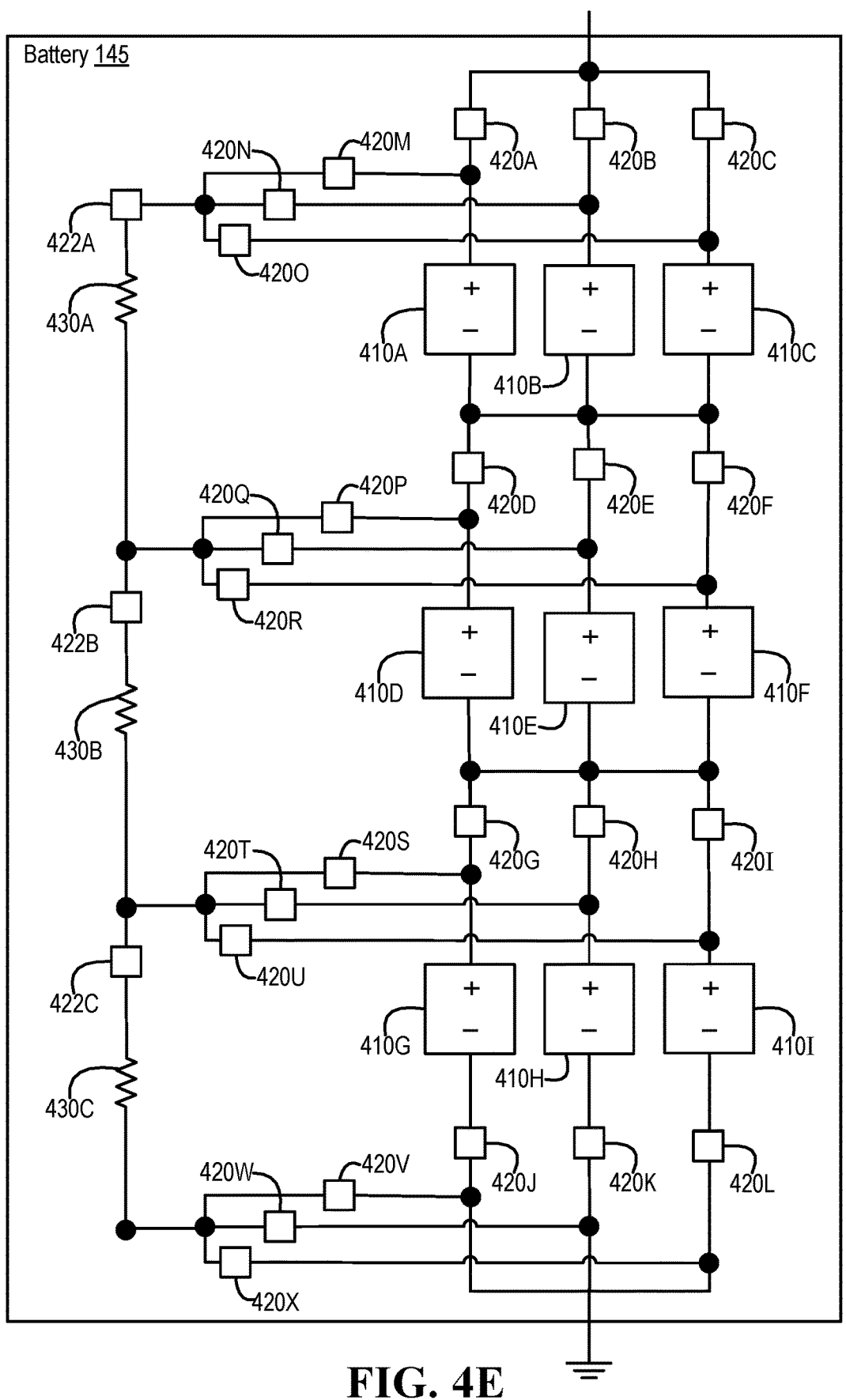
FIG. 4E illustrates another example of a rechargeable battery, according to one or more embodiments.

Turning now to FIG. 4E, another example of a rechargeable battery is illustrated, according to one or more embodiments. As shown, battery 145 may include electrically actuated switches 420A-420X. In one or more embodiments, BMU 140 may control one or more of electrically actuated switches 420A-420X. In one example, one or more of electrically actuated switches 420A-420L may be utilized in changing a topology of battery 145. In another example, one or more of electrically actuated switches 420M-420X may be utilized in charge balancing and/or charge rebalancing one or more of cells 410A-410I. As illustrated, battery 145 may include resistors 430A-430C. For example, one or more of resistors 430A-430C may be utilized in charge balancing and/or charge rebalancing one or more of cells 410A-410I. As shown, battery 145 may include electrically actuated switches 422A-422C. In one or more embodiments, BMU 140 may control electrically actuated switches 422A-422C. For example, one or more of electrically actuated switches 422A-422C may be utilized in charge balancing and/or charge rebalancing one or more of cells 410A-410I.

In one or more embodiments, an electrically actuated switch may include an electrically actuated relay. In one example, the electrically actuated relay may include an electrically actuated mechanical relay. In another example, the electrically actuated relay may include a solid state relay. For instance, the electrically actuated relay may include one or more transistors. In one or more embodiments, an electrically actuated switch may include one or more transistors. In one example, a transistor may include a bipolar junction transistor (BJT). In another example, a transistor may include a field effect transistor (FET).

Figure 5A:
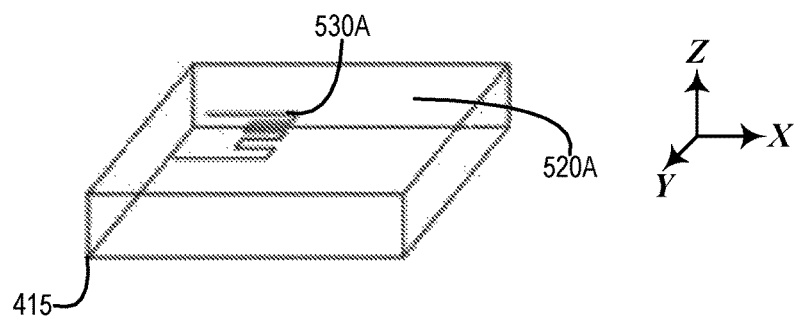
FIGS. 5A-5I illustrate examples of an enclosure, according to one or more embodiments.
Figure 5B:
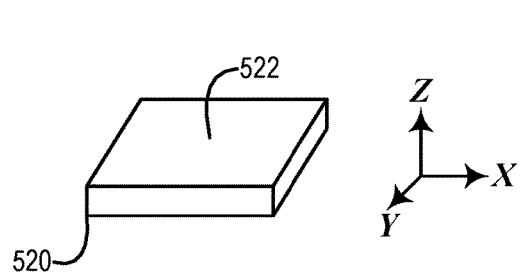
Figure 5C:
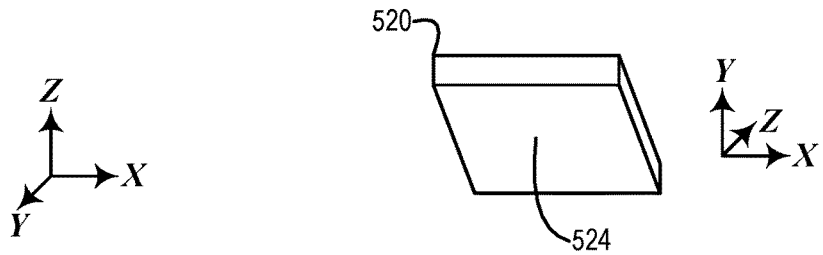

Turning now to FIGS. 5A-5I, examples of an enclosure are illustrated, according to one or more embodiments. As shown in FIG. 5A, an enclosure 415 may include a barrier 520A. Although enclosure 415 is illustrated as a cuboid, enclosure 415 may include any enclosed three-dimensional shape configured to store a cell of a battery, according to one or more embodiments. In one example, enclosure 415 may include a bag or a pouch. In another example, enclosure 415 may include a cylinder. As illustrated, a resistor 530A may be associated with barrier 520A. In one or more embodiments, a barrier 520 may include multiple surfaces. In one example, barrier 520 may include a surface 522, as shown in FIG. 5B. For instance, surface 522 may be an outer surface with respect to enclosure 415. In another example, barrier 520 may include a surface 524, as illustrated in FIG. 5C. For instance, surface 524 may be an inner surface with respect to enclosure 415.

In one or more embodiments, a resistor 530 associated with barrier 520 may be at or on various locations of barrier 520. In one example, resistor 530 may be on surface 522 of barrier 520. For instance, resistor 530 may be fixed to surface 522 of barrier 520. In a second example, resistor 530 may be on surface 524 of barrier 520. For instance, resistor 530 may be fixed to surface 524 of barrier 520. In another example, resistor 530 may be within (e.g., inside) barrier 520. For instance, resistor 530 may be fixed within (e.g., inside) barrier 520.

In one or more embodiments, an impedance of resistor 530 may be based at least on a change in shape of barrier 520. In one example, a first impedance of resistor 530 may be associated with barrier 520 when surfaces 522 and/or 524 are planar, or nearly planar. In a second example, a second impedance of resistor 530 may be associated with barrier 520 when surfaces 522 and/or 524 are curved. For instance, the second impedance of resistor 530 may be different from the first impedance of resistor 530. In another example, a third impedance of resistor 530 may be associated with barrier 520 when surfaces 522 and/or 524 are elongated (e.g., stretched). For instance, surfaces 522 and/or 524 may be elongated with respect to an X-axis and/or a Y-axis, and the third impedance of resistor 530 may be different from the first impedance of resistor 530 and/or may be different from the second impedance of resistor 530.

Figure 5D:
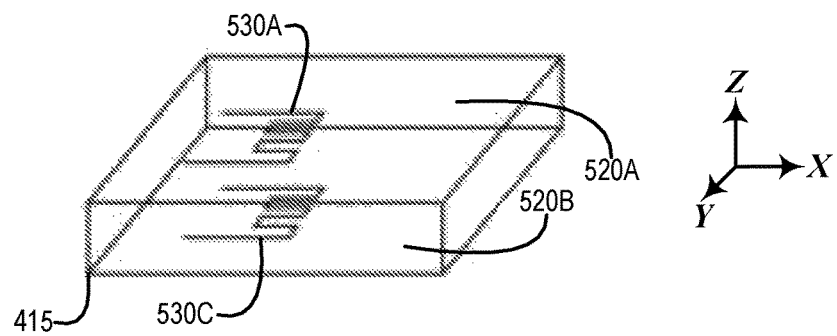
Figure 5E:
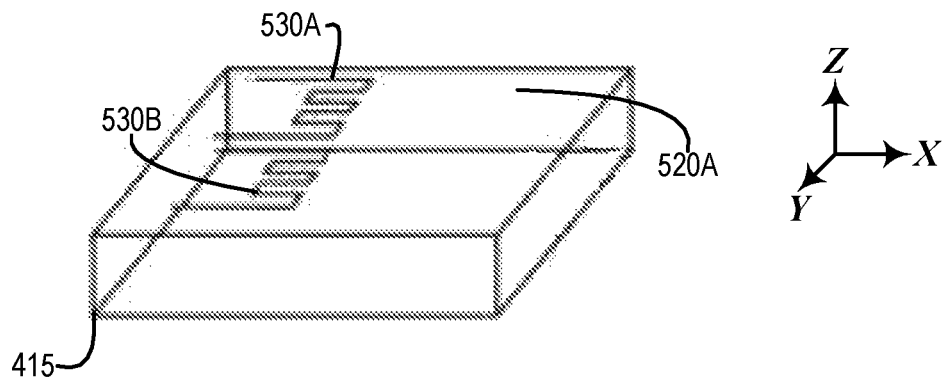
Figure 5F:
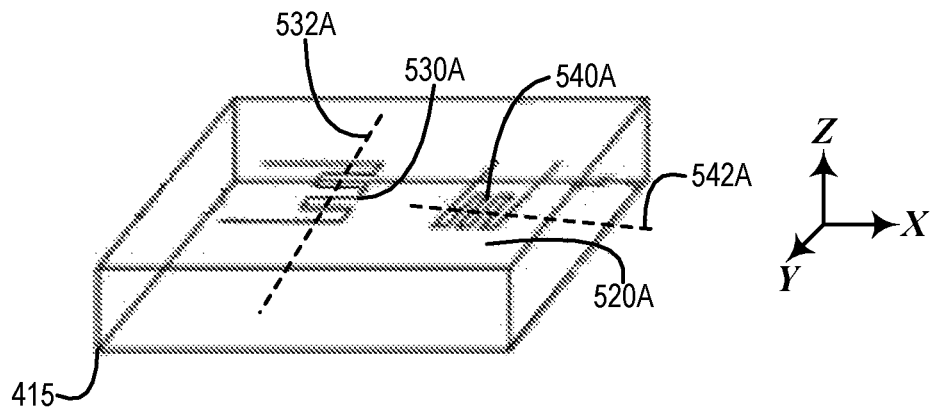

As illustrated in FIG. 5D, resistor 530A may be associated with surface 520A, and a resistor 530C may be associated with a surface 520B. As shown in FIG. 5E, resistor 530A may be associated with surface 520A, and a resistor 530B may be associated with surface 520A. As illustrated in FIG. 5F, resistor 530A may be associated with surface 520A, and a resistor 540A may be associated with surface 520A. In one or more embodiments, a resistor 540 may include one or more structures and/or functionalities as those described with reference to resistor 530.

As shown, a longitudinal axis 532A of resistor 530A may be oriented parallel or nearly parallel to the Y-axis. As illustrated, a longitudinal axis 542A of resistor 540A may be oriented parallel or nearly parallel to the X-axis. In one or more embodiments, a longitudinal axis 532 of a resistor 530 may be oriented orthogonal to a longitudinal axis 542 of a resistor 540. In one or more embodiments, a longitudinal axis 532 of a resistor 530 may be oriented nearly orthogonal to a longitudinal axis 542 of a resistor 540. For example, a longitudinal axis 532 of a resistor 530 may be oriented within plus or minus five degrees orthogonal to a longitudinal axis 542 of a resistor 540. In one or more embodiments, an impedance of a resistor 530 may change more than an impedance of a resistor 540 when barrier 520 changes with respect to the Y-axis. In one or more embodiments, an impedance of a resistor 540 may change more than an impedance of a resistor 530 when barrier 520 changes with respect to the X-axis.

Figure 5G:
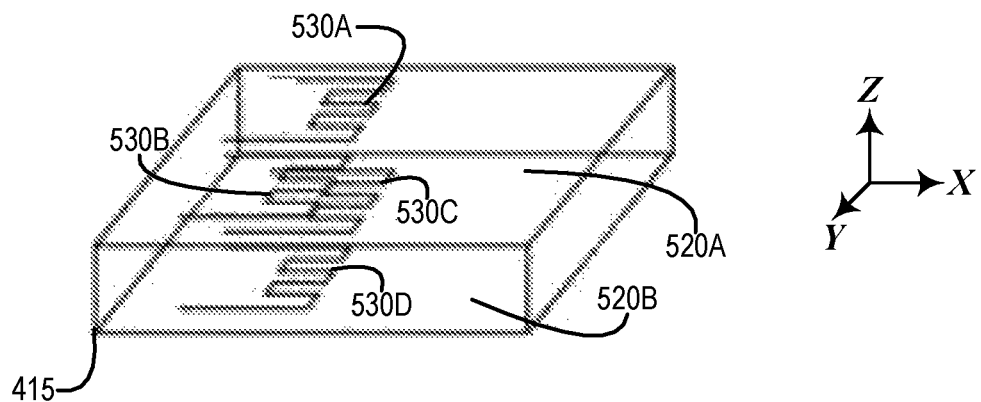
Figure 5H:
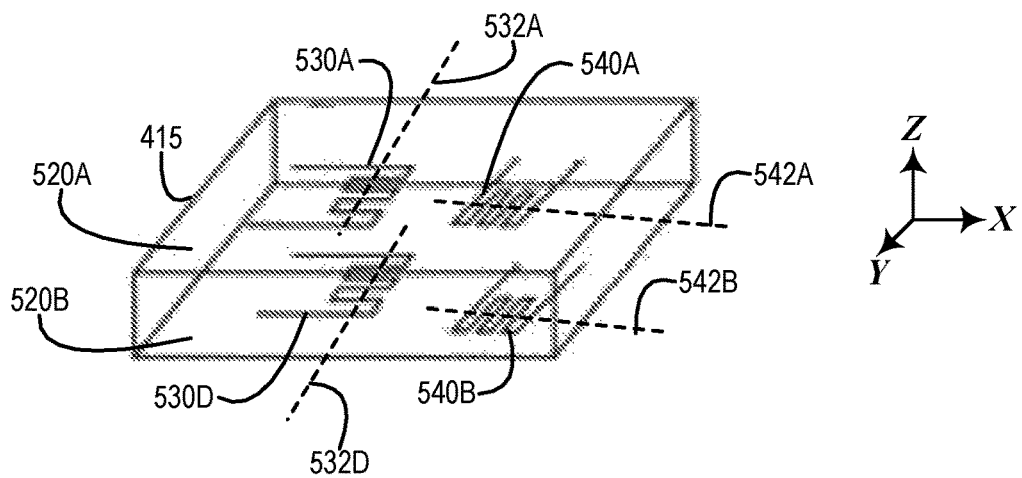

As shown in FIG. 5G, resistors 530A and 530B may be associated with barrier 520A, and resistors 530C and 530D may be associated with barrier 520B. As illustrated in FIG. 5H, resistors 530A and 540A may be associated with barrier 520A, and resistors 530D and 540B may be associated with barrier 520B. As shown, longitudinal axis 532A of resistor 530A and a longitudinal axis 532D of resistor 530D may be oriented parallel or nearly parallel to the Y-axis. As illustrated, longitudinal axis 542A of resistor 540A and a longitudinal axis 542B of resistor 540B may be oriented parallel or nearly parallel to the X-axis.

Figure 5I:
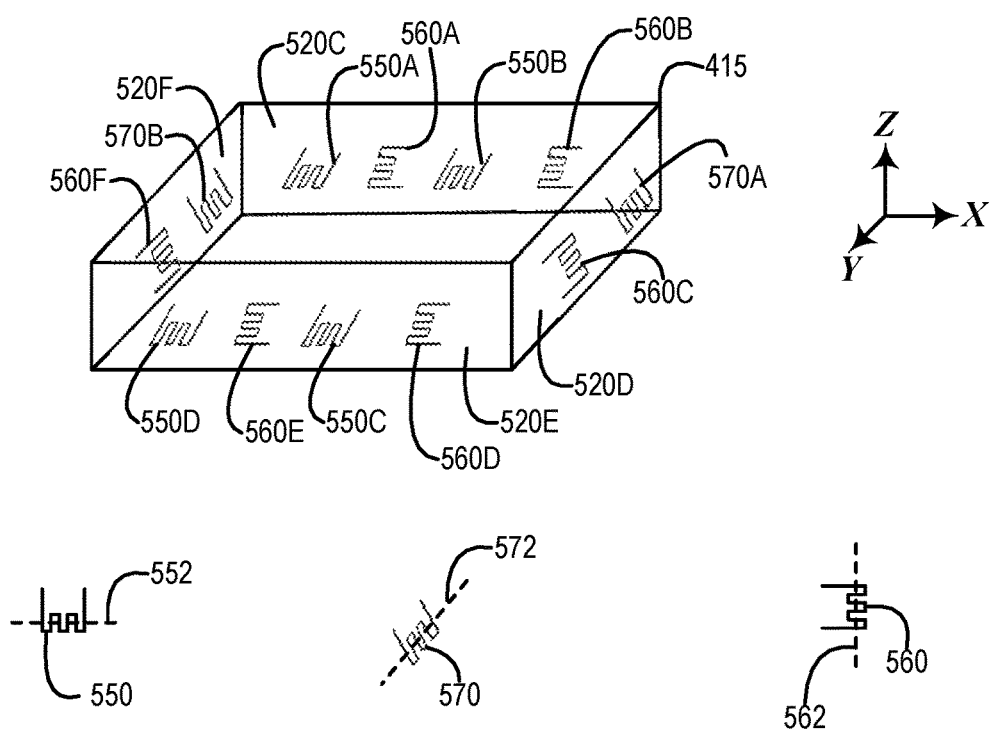

As illustrated in FIG. 5I, resistors 550A and 550B and resistors 560A and 560B may be associated with a barrier 520C. As shown, resistors 560C and 570A may be associated with a barrier 520D. As illustrated, resistors 550C and 550D and resistors 560D and 560E may be associated with a barrier 520E. As shown, resistors 560F and 570B may be associated with a barrier 520F. As illustrated, a longitudinal axis 552 of a resistor 550 may be oriented parallel to the X-axis. As shown, a longitudinal axis 562 of a resistor 560 may be oriented parallel or nearly parallel to a Z-axis. In one or more embodiments, a longitudinal axis 552 of a resistor 550 may be oriented orthogonal to a longitudinal axis 562 of a resistor 560.

In one or more embodiments, a longitudinal axis 552 of a resistor 550 may be oriented nearly orthogonal to a longitudinal axis 562 of a resistor 560. For example, a longitudinal axis 552 of a resistor 550 may be oriented within plus or minus five degrees orthogonal to a longitudinal axis 562 of a resistor 560. As illustrated, a longitudinal axis 572 of a resistor 570 may be oriented parallel to the Y-axis.

In one or more embodiments, a longitudinal axis 572 of a resistor 570 may be oriented orthogonal to a longitudinal axis 562 of a resistor 560. In one or more embodiments, a longitudinal axis 572 of a resistor 570 may be oriented nearly orthogonal to a longitudinal axis 562 of a resistor 560. For example, a longitudinal axis 572 of a resistor 570 may be oriented within plus or minus five degrees orthogonal to a longitudinal axis 562 of a resistor 560.

In one or more embodiments, a longitudinal axis 552 of a resistor 550 may be oriented orthogonal to a longitudinal axis 572 of a resistor 570. In one or more embodiments, a longitudinal axis 552 of a resistor 550 may be oriented nearly orthogonal to a longitudinal axis 572 of a resistor 570. For example, a longitudinal axis 552 of a resistor 550 may be oriented within plus or minus five degrees orthogonal to a longitudinal axis 572 of a resistor 570.

Figure 6A:
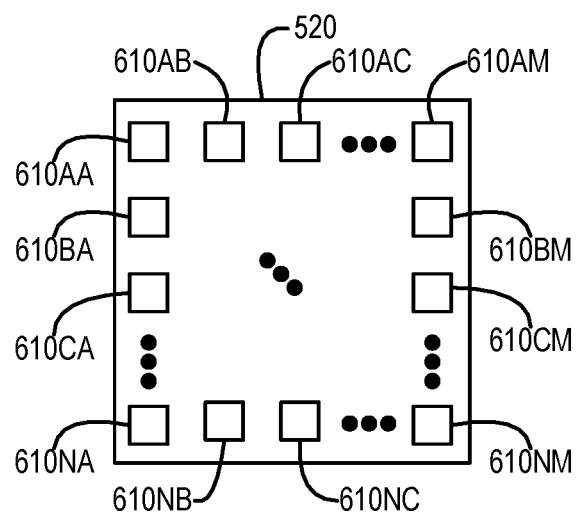
FIG. 6A illustrates an example of resistors associated with a barrier of an enclosure of a cell of a battery, according to one or more embodiments.

Turning now to FIG. 6A, an example of resistors associated with a barrier of an enclosure of a cell of a battery is illustrated, according to one or more embodiments. As shown, resistors 610AA-610NM may be associated with a barrier 520. For example, any number of resistors 610 may be associated with barrier 520. In one or more embodiments, a resistor 610 may be a resistor 530, a resistor 540, a resistor 550, a resistor 560, or a resistor 570. Although resistors 610AA-610NM are illustrated as rows and columns, resistors 610AA-610NM may be arranged in any physical location and/or may be arranged with any arrangement, according to one or more embodiments.

In one or more embodiments, at least a portion of a topography of barrier 520 may be determined. For example, if barrier 520 changes from a first shape to a second shape, one or more of resistors 610AA-610NM may be utilized in determining that barrier 520 changed from the first shape to the second shape. For instance, an impedance of a resistor 610 may change when barrier 520 changes from the first shape to the second shape. In one or more embodiments, at least a portion of a topography of barrier 520 may be determined based at least on one or more impedance changes of respective one or more resistors 610AA-610NM. As an example, one or more impedance changes of respective one or more resistors 610AA-610NM may indicate that at least a portion of barrier 520 has become bowed (e.g., curved) outward from enclosure 415. For instance, a buildup of gas within enclosure 415 may cause at least a portion of barrier 520 to become bowed (e.g., curved) outward from enclosure 415.

In one or more embodiments, one or more of resistors 610AA-610NM may include a resistive fabric that changes impedance when elongated along an axis (e.g., any arbitrary axis) and/or when elongated with respect to an axis (e.g., any arbitrary axis). For example, a resistor 610 may include a piezoresistive fabric. For instance, when the resistive fabric is stretched (e.g., elongated), an impedance value associated with the resistive fabric may change. As an example, the resistive fabric may be associated with a first impedance value, and when the resistive fabric is stretched (e.g., elongated), the resistive fabric may be associated with a second impedance value, different from the first impedance value.

In one or more embodiments, a resistor 610 may change a value of impedance based at least on strain. For example, a resistor 610 may change a value of impedance based at least on one or more types of strain. For instance, the one or more types of strain may include axial, bending, compressive, shear, and torsional, among others. In one or more embodiments, the resistive fabric may decrease in impedance with it is compressed and/or may increase in impedance when expanded and/or stretched (e.g., elongated).

Figure 6B:
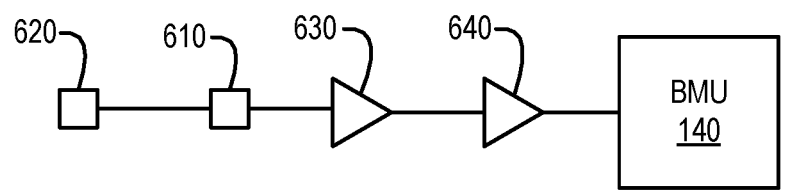
FIG. 6B illustrates an example of a schematic diagram for determining an impedance of a resistor, according to one or more embodiments.

Turning now to FIG. 6B, an example of a schematic diagram for determining an impedance of a resistor is illustrated, according to one or more embodiments. As shown, a voltage source 420 may be coupled to a resistor 610. As illustrated, resistor 610 may be coupled to an amplifier 630. As shown, amplifier 630 may be coupled to an analog to digital converter (ADC) 640. As illustrated, ADC 640 may be coupled to BMU 140. In one or more embodiments, ADC 640 may convert one or more analog signals to digital data. For example, ADC 640 may provide the digital data to BMU 140. In one or more embodiments, BMU 140 may determine a change in impedance of resistor 610 based at least on the digital data from ADC 640.

Figure 6C:
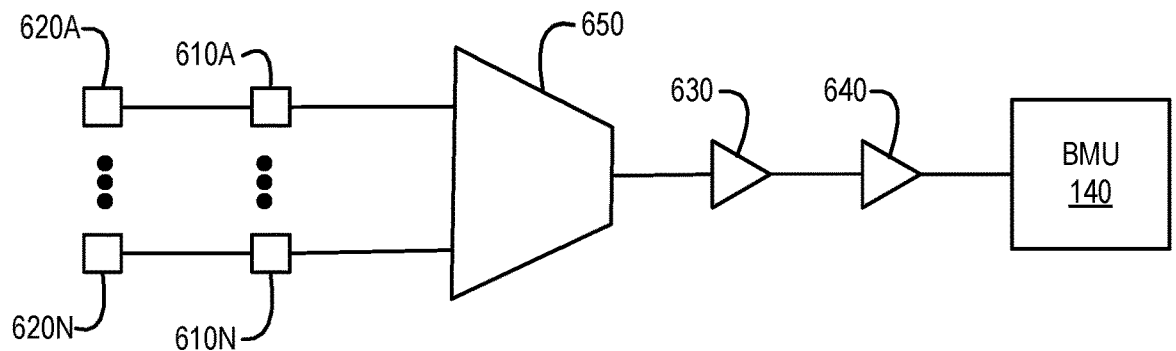
FIG. 6C illustrates an example of a schematic diagram for determining impedances of multiple resistors, according to one or more embodiments.

Turning now to FIG. 6C, an example of a schematic diagram for determining impedances of multiple resistors is illustrated, according to one or more embodiments. As shown, voltage sources 620A-620N may be respectively coupled to resistors 610A-610N. Although multiple voltage sources 620A-620N are illustrated to be respectively coupled to resistors 610A-610N, a single voltage source 620 may be coupled to resistors 610A-610N.

As illustrated, resistors 610 may be coupled to a multiplexer (MUX) 650. In one or more embodiments, MUX 650 may be controlled to select a signal from a resistor of resistors 610A-610N. For example, BMU 140 may control MUX 650 to select a signal from a resistor of resistors 610A-610N. As shown, MUX 650 may be coupled to an amplifier 630. As illustrated, amplifier 630 may be coupled to ADC 640. As shown, ADC 640 may be coupled to BMU 140.

In one or more embodiments, ADC 640 may convert one or more analog signals to digital data. For example, ADC 640 may provide the digital data to BMU 140. In one or more embodiments, BMU 140 may determine a change in impedance of a resistor 610 of resistors 610A-610N based at least on the digital data from ADC 640.

Figure 6D:
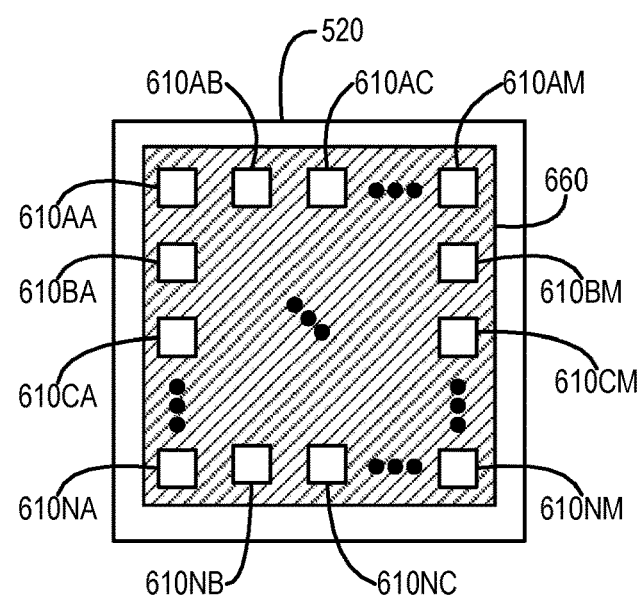
FIG. 6D illustrates an example of multiple resistors implemented via a resistive fabric, according to one or more embodiments.
Figure 6D:
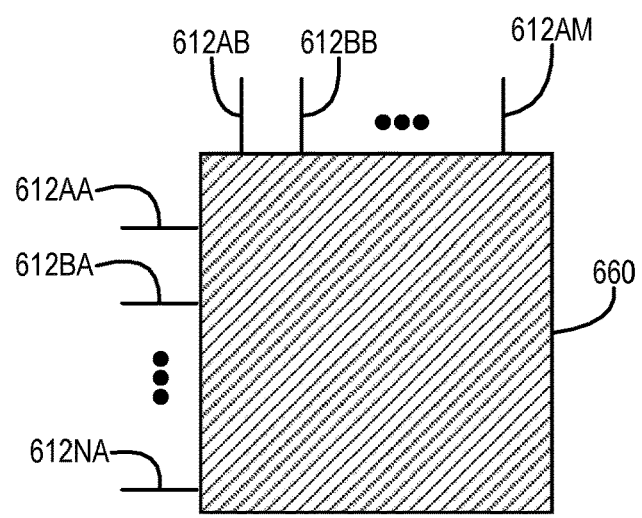

Turning now to FIG. 6D, an example of multiple resistors implemented via a resistive fabric is illustrated, according to one or more embodiments. As shown, a resistive fabric 660 may be associated with barrier 520. In one example, resistive fabric 660 may be fixed to a surface of barrier 520. In another example, resistive fabric 660 may be included within a surface of barrier 520. In one or more embodiments, resistive fabric 660 may include a piezoresistive fabric. For instance, when resistive fabric 660 is stretched (e.g., elongated), an impedance value associated with resistive fabric 660 may change. As an example, resistive fabric 660 may be associated with a first impedance value, and when resistive fabric 660 is stretched (e.g., elongated), resistive fabric 660 may be associated with a second impedance value, different from the first impedance value.

In one or more embodiments, a resistor 610 may be implemented via resistive fabric 660. For example, one or more of resistors 610AA-610NM may be one or more virtual resistors. For instance, resistive fabric 660 may include a single piece of fabric. As illustrated, electrical leads 612AA-612NA and 612AB-612AM may be coupled to resistive fabric 660. For example, an impedance may be determined between two of leads 612AA-612NA and 612AB-612AM. In one instance, an impedance may be determined between two of leads 612AA and 612AB as an impedance of a resistor 610AA. In another instance, a physical location of a resistor 610AA may be based at least on physical locations of the two of leads 612AA and 612AB. In a second example, an impedance may be determined between two of leads 612AA and 612AM as an impedance of a resistor 610AM. In another instance, an impedance may be determined between two of leads 612NA and 612AM as an impedance of a resistor 610NM.

In one or more embodiments, a first lead of leads 612AA-612NA and 612AB-612AM may be coupled to a voltage source 620, and a second lead of leads 612AA-612NA and 612AB-612AM may be coupled to an amplifier 630, in which the second lead is different from the first lead. For example, amplifier 630 may be coupled to an ADC 640. For instance, ADC 640 may be coupled to BMU 140. In one or more embodiments, BMU 140 may determine an impedance value between the first lead and the second lead.

In one or more embodiments, at least a portion of a topography of resistive fabric 660 may be determined. For example, the at least the portion of the topography of resistive fabric 660 may be utilized as at least a portion of a topography of barrier 520. For instance, the at least the portion of the topography of barrier 520 may be determined via determining the at least the portion of the topography of resistive fabric 660. In one or more embodiments, determining the at least the portion of the topography of resistive fabric 660 may include determining one or more impedance values of resistors 610AA-610NM, implemented via resistive fabric 660, by determining one or more impedance values between pairs of leads 612AA and 612AM. For example, if barrier 520 changes from a first shape to a second shape, one or more of resistors 610AA-610NM may be utilized in determining that barrier 520 changed from the first shape to the second shape. For instance, an impedance of a resistor 610 may change when barrier 520 changes from the first shape to the second shape.

In one or more embodiments, at least a portion of a topography of barrier 520 may be determined based at least on one or more impedance changes of respective one or more resistors 610AA-610NM, implemented via resistive fabric 660. As an example, one or more impedance changes of respective one or more resistors 610AA-610NM may indicate that at least a portion of barrier 520 has become bowed (e.g., curved) outward from enclosure 415. For instance, a buildup of gas within enclosure 415 may cause at least a portion of barrier 520 to become bowed (e.g., curved) outward from enclosure 415.

Figure 7A:
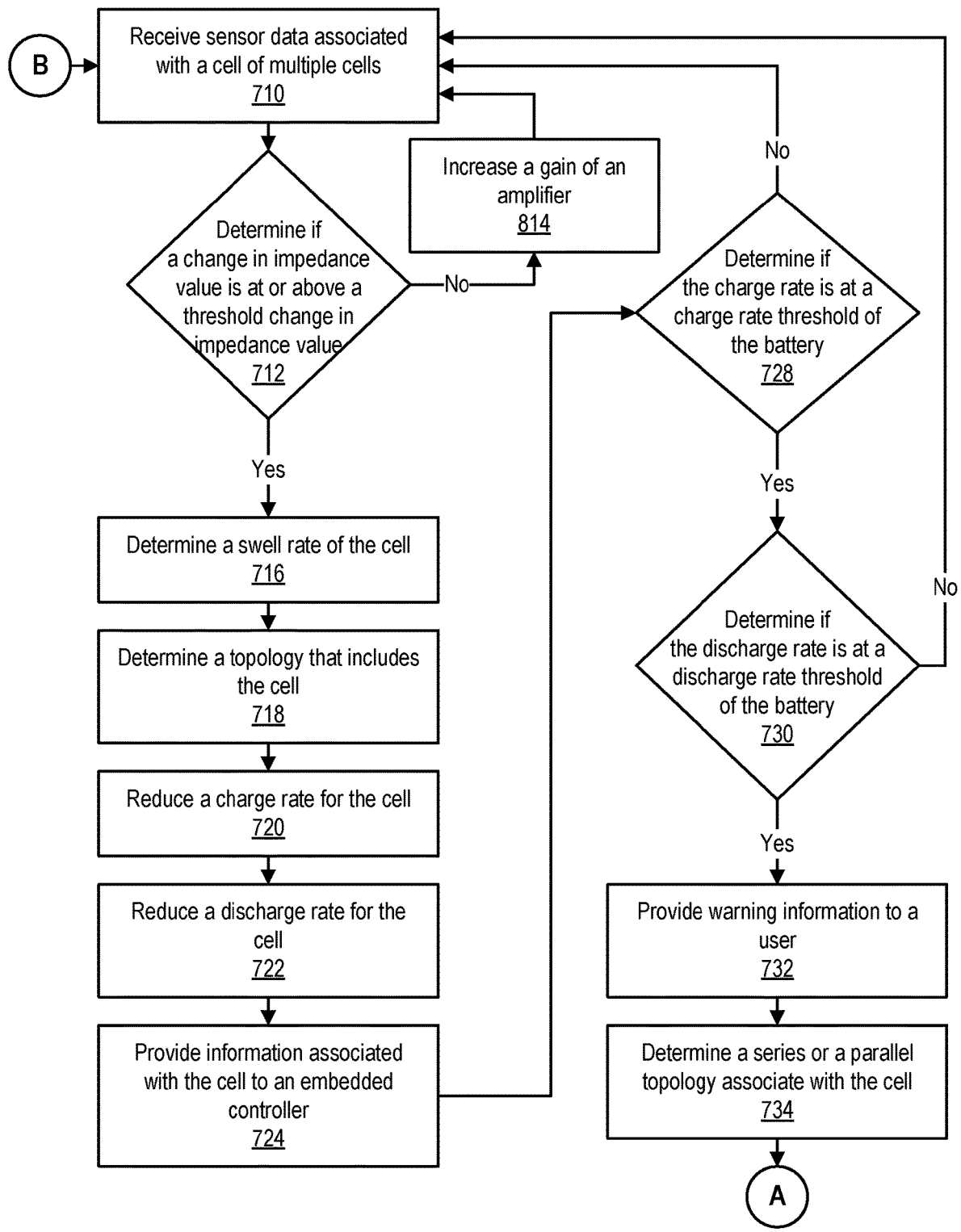
FIGS. 7A and 7B illustrate an example of a method of utilizing a rechargeable battery, according to one or more embodiments.
Figure 7B:
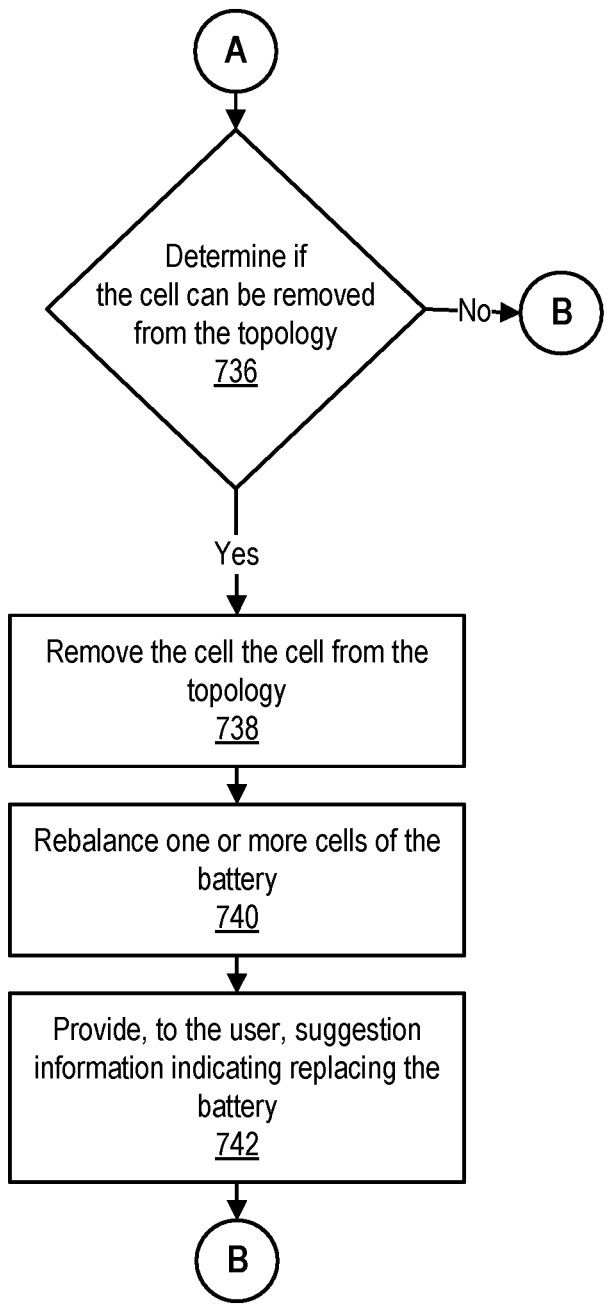

Turning now to FIGS. 7A and 7B, an example of a method of utilizing a rechargeable battery is illustrated, according to one or more embodiments. At 710, sensor data associated with a cell of multiple cells may be received. For example, BMU 140 may receive sensor data associated with a cell 410 of cells 410A-410N. For instance, BMU 140 may receive the sensor data associated with cell 410 of cells 410A-410N from at least one ADC 640. As an example, the sensor data associated with cell 410 may include at least one impedance value of at least one resistor 610 associated with an enclosure 415 of cell 410.

At 712, it may be determined if a change in impedance value is at or above a threshold change in impedance value. For example, BMU 140 may determine if a change in impedance value of a resistor 610 is at or above a threshold change in impedance value. In one or more embodiments, determining if a change in impedance value of a resistor 610 is at or above a threshold change in impedance value may include comparing a current impedance value of resistor 610 with a previous impedance value of resistor 610. For example, comparing the current impedance value of resistor 610 with the previous impedance value of resistor 610 may include determining a difference between the current impedance value of resistor 610 and the previous impedance value of resistor 610. For instance, determining if the change in impedance value of the resistor 610 is at or above the threshold change in impedance may include determining if the difference between the current impedance value of resistor 610 and the previous impedance value of resistor 610 is at or above the threshold change in impedance value.

If the change in impedance value is not at or above the threshold change in impedance value, a gain of an amplifier may be increased, at 714. For example, BMU 140 may increase a gain of an amplifier 630. In one or more embodiments, increasing the gain of the amplifier may include increasing the gain of the amplifier gain within one or more limits. The method may proceed to 710, according to one or more embodiments.

If the change in impedance value is at or above the threshold change in impedance value, a swell rate of the cell may be determined, at 716. For example, BMU 140 may determine a swell rate of cell 410. In one or more embodiments, determining a swell rate of the cell may include determining a volumetric change associated with the cell. For instance, determining the volumetric change associated with the cell may include determining a volumetric change associated with the enclosure of the cell. In one or more embodiments, determining a swell rate of the cell may be based at least on the change in impedance value of the resistor with respect to an amount of time transpiring. For example, the amount of time transpiring may include an interval of time between determining the previous impedance value of resistor the resistor and determining the current impedance value of resistor the resistor. In one or more embodiments, a distance of travel associate with a barrier of the enclosure may be based at least on the change in impedance value of the resistor.

At 718, a topology that includes the cell may be determined. For example, BMU 140 may determine a topology that includes cell 410. For instance, determining a topology that includes cell 410 may include accessing stored data that includes information associated with one or more topologies that include cells 410A-410N. As an example, an identifier may be associated with cell 410, and the topology that includes cell 410 may determine based at least on searching the information associated with the one or more topologies that include cells 410A-410N and based at least on the identifier may be associated with cell 410.

At 720, a charge rate for the cell may be reduced. For example, BMU 140 may reduce a charge rate for cell 410. For instance, the charge rate for cell 410 may be reduced when cell 410 is being charged. At 722, a discharge rate for the cell may be reduced. For example, BMU 140 may reduce a discharge rate for cell 410. For instance, discharge rate for cell 410 may be reduced when cell 410 is being discharged.

At 724, information associated with the cell may be provided to an embedded controller. For example, BMU 140 may provide information associated with cell 410 to EC 130. For instance, BMU 140 may provide the information associated with cell 410 to EC 130 via a bus. As an example, the bus may include a SMBus. At 728, it may be determined if the charge rate is at a charge rate threshold of the battery. For example, EC 130 may determine if the charge rate is at a charge rate threshold of battery 145.

If the charge rate is not at the charge rate threshold of the battery, the method may proceed to 710, according to one or more embodiments. If the charge rate is at the charge rate threshold of the battery, it may be determined if the discharge rate is at a discharge rate threshold of the battery, at 730. For example, EC 130 may determine if the charge rate is at the charge rate threshold of battery 145.

If the discharge rate is not at the discharge rate threshold of the battery, the method may proceed to 710, according to one or more embodiments. If the discharge rate is at the discharge rate threshold of the battery, warning information may be provided to a user of the information handling system, at 732. In one example, providing the warning information to the user may include displaying, via a display, warning information indicating one or more issues with the battery. In a second example, providing the warning information to the user may include illuminating one or more light emitting diodes (LEDs), indicating one or more issues with the battery. In another example, providing the warning information to the user may include producing one or more sounds indicating one or more issues with the battery. In one or more embodiments, warning information may be provided to another information handling system. For instance, warning information may be provided to the other information handling system via a network.

At 734, a series or a parallel topology associate with the cell may be determined. For example, EC 130 may determine a series or a parallel topology associate with cell 410.

As an example, a parallel topology associate with cell 410F, as illustrated in FIG. 4B, may be determined. For instance, cell 410F may be in parallel with cells 410D and 410E. At 736, it may be determined if the cell can be removed from the topology. For example, EC 130 may determine if cell 410 can be removed from the topology.

If the cell cannot be removed from the topology, the method may proceed to 710, according to one or more embodiments. If the cell can be removed from the topology, the cell may be removed from the topology, at 738. For example, EC 130 may remove cell 410 from the topology. For instance, EC 130 may remove cell 410F from the topology, as illustrated in FIG. 4C. As an example, cell 410 may be coupled to one or more other cells 410 via one or more electrically actuated switches. In one or more embodiments, EC 130 removing cell 410 from the topology may include EC 130 instructing BMU 140 to remove cell 410 from the topology. For example, BMU 140 may remove cell 410 from the topology.

In one or more embodiments, when a cell is removed from a topology, other cells may be removed from other topologies as well. For example, if cell 410F from its topology, cells 410C and 410I may be re moved from their respective topologies, as well, as illustrated in FIG. 4D. For instance, one or more electrically actuated switches 420A-420L, illustrated in FIG. 4E, may be utilized to remove cells 420C, 420F, and 420I from the topology. Removing the cell from the topology may include controlling one or more electrically actuated switches to remove the cell from the topology, according to one or more embodiments. For example, one or more electrically actuated switches 420A-420L, illustrated in FIG. 4E, may be controlled to remove cell 420 from the topology. For instance, one or more of electrically actuated switches 420F and 420I may be controlled to remove cell 410 from the topology.

At 740, one or more cells of the battery may be rebalanced. For example, BMU 140 may rebalance charges one or more cells of battery 145. In one instance, charges of one or more of cells 410A-410E and 410G-410I may be rebalanced. In another instance, charges of one or more of cells 410A, 410B, 410D, 410E, 410G, and 410H may be rebalanced. For or more embodiments, one or more electrically actuated switches 420M-420X and 422A-422C, illustrated in FIG. 4E, may be utilized to charge balance and/or charge rebalance one or more of cells 410A-410I. In one example, one or more of resistors 430A-430C, illustrated in FIG. 4E, may be utilized to charge balance and/or charge rebalance one or more of cells 410A-410I. In one or more embodiments, one or more electrically actuated switches 420M-420X and 422A-422C, illustrated in FIG. 4E, may be utilized to charge balance and/or charge rebalance one or more of cells 410A, 410B, 410D, 410E, 410G, and 410H. For example, one or more of resistors 430A-430C, illustrated in FIG. 4E, may be utilized to charge balance and/or charge rebalance one or more of cells 410A, 410B, 410D, 410E, 410G, and 410H.

At 742, suggestion information indicating replacing the battery may be provided to the user. In one example, providing the suggestion information indicating replacing the battery may include displaying, via a display, suggestion information indicating that the battery should be replaced. In a second example, providing the suggestion information indicating replacing the battery may include illuminating one or more LEDs, indicating replacing the battery. In another example, providing the suggestion information indicating replacing the battery may include producing one or more sounds indicating replacing the battery. In one or more embodiments, suggestion information indicating replacing the battery may be provided to another information handling system. For example, providing the suggestion information to the other information handling system may include providing the suggestion information to the other information handling system via a network. In one or more embodiments, the method may proceed to 710.

Figure 8A:
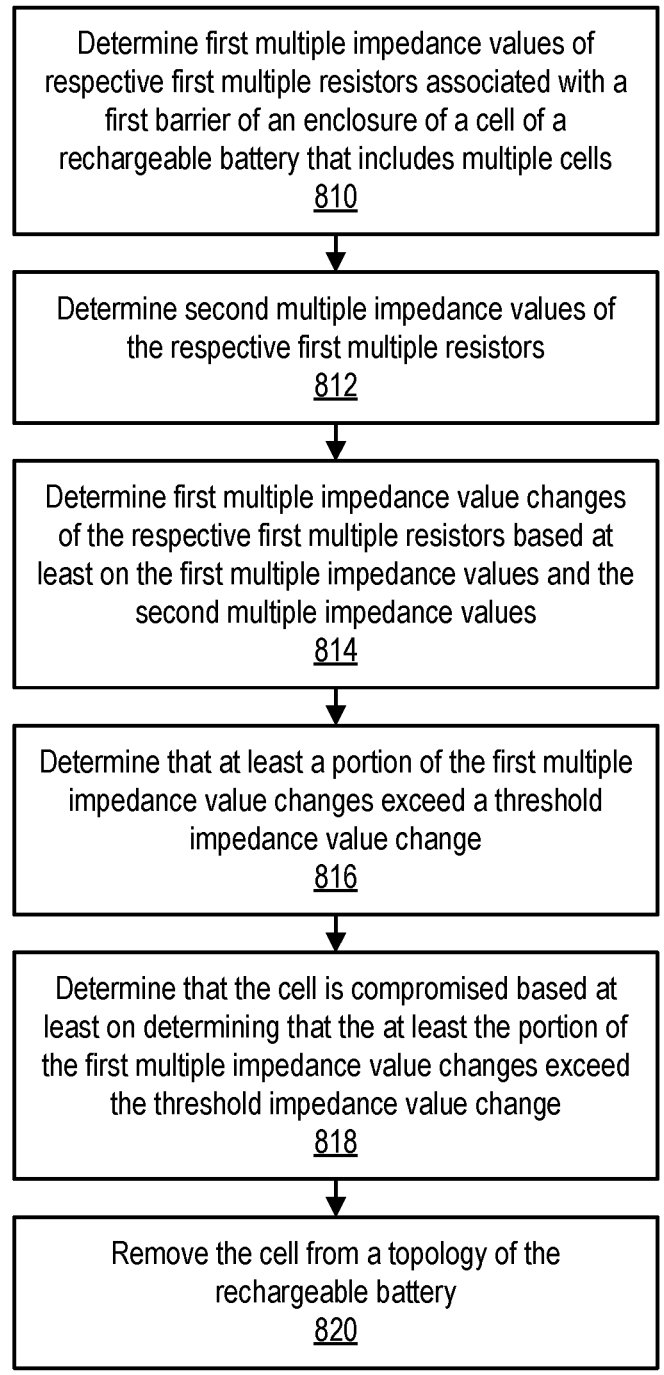
FIG. 8A illustrates a second example of a method of utilizing a rechargeable battery, according to one or more embodiments.

Turning now to FIG. 8A, a second example of a method of utilizing a rechargeable battery is illustrated, according to one or more embodiments. At 810, first multiple impedance values of respective first multiple resistors associated with a first barrier of an enclosure of a cell of a rechargeable battery that includes multiple cells may be determined. For example, BMU 140 may determine first multiple impedance values of respective first multiple resistors associated with a first barrier of enclosure 520F of cell 410F. In one or more embodiments, a value may include a numeric value.

At 812, second multiple impedance values of the respective first multiple resistors may be determined. For example, BMU 140 may determine second multiple impedance values of the respective first multiple resistors. At 814, first multiple impedance value changes of the respective first multiple resistors may be determined based at least on the first multiple impedance values and the second multiple impedance values. For example, BMU 140 may determine first multiple impedance value changes of the respective first multiple resistors based at least on the first multiple impedance values and the second multiple impedance values. In one or more embodiments, a value change may include a numeric value.

At 816, it may be determined that at least a portion of the first multiple impedance value changes exceed a threshold impedance value change. For example, BMU 140 may determine that at least a portion of the first multiple impedance value changes exceed a threshold impedance value change. At 818, it may be determined that the cell is compromised based at least on determining that the at least the portion of the first multiple impedance value changes exceed the threshold impedance value change. For example, BMU 140 may determine that cell 410F is compromised based at least on determining that the at least the portion of the first multiple impedance value changes exceed the threshold impedance value change.

At 820, the cell may be removed from a topology of the rechargeable battery. For example, BMU 140 may remove cell 410F from a topology of battery 145. In one or more embodiments, removing the cell from a topology of the rechargeable battery may be performed in response to determining that the cell is compromised. In one or more embodiments, removing the cell from the topology of the rechargeable battery may include configuring the rechargeable battery such that the cell is no longer actively charged and/or is no longer actively discharged. For example, removing the cell from the topology of the rechargeable battery may include configuring the rechargeable battery to electrically bypass utilizing the cell.

Figure 8B:
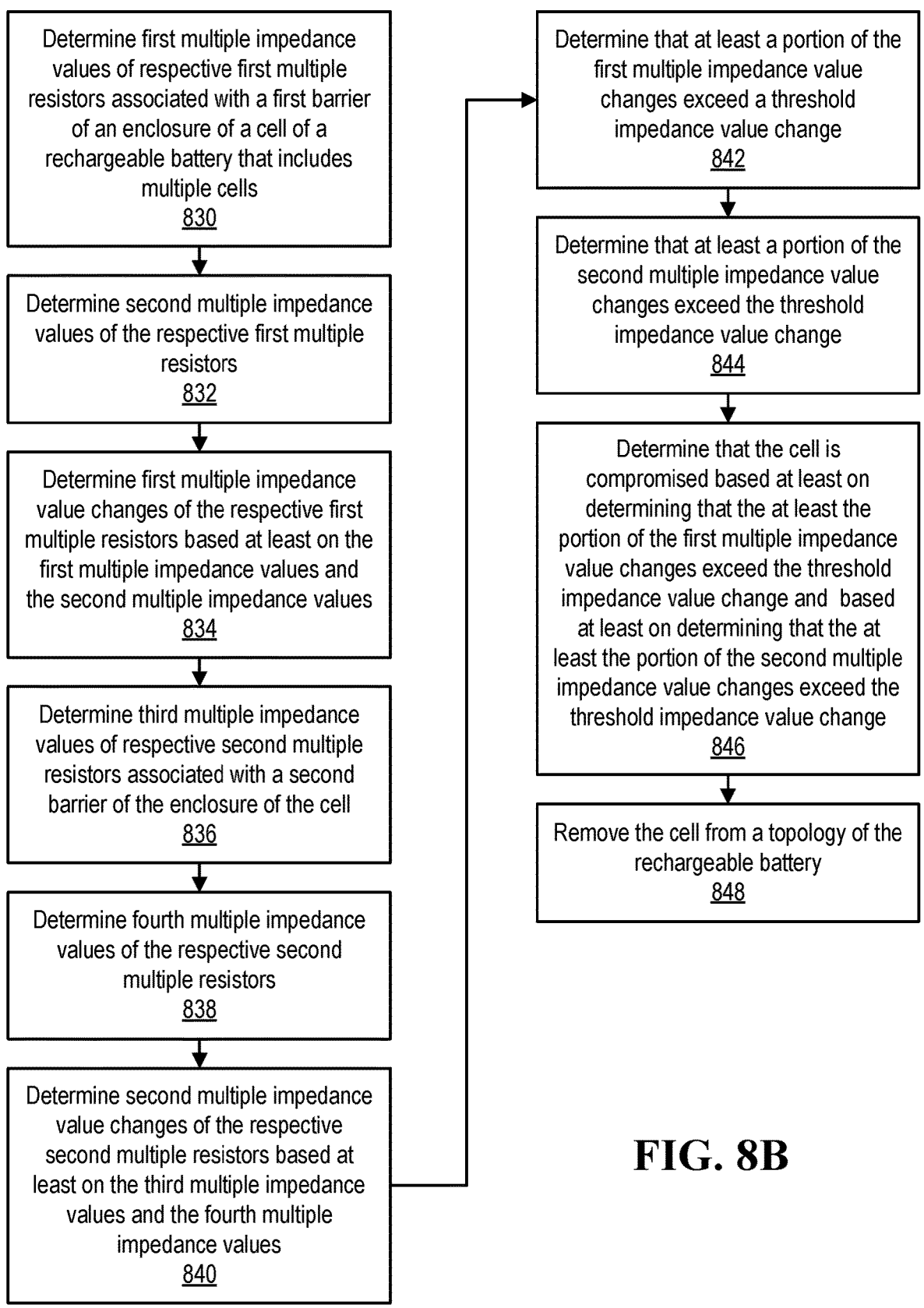
FIG. 8B illustrates another example of a method of utilizing a rechargeable battery, according to one or more embodiments.

Turning now to FIG. 8B, another example of a method of utilizing a rechargeable battery is illustrated, according to one or more embodiments. At 830, first multiple impedance values of respective first multiple resistors associated with a first barrier of an enclosure of a cell of a rechargeable battery that includes multiple cells may be determined. For example, BMU 140 may determine first multiple impedance values of respective first multiple resistors associated with a first barrier of enclosure 520F of cell 410F.

At 832, second multiple impedance values of the respective first multiple resistors may be determined. For example, BMU 140 may determine second multiple impedance values of the respective first multiple resistors. At 834, first multiple impedance value changes of the respective first multiple resistors may be determined based at least on the first multiple impedance values and the second multiple impedance values. For example, BMU 140 may determine first multiple impedance value changes of the respective first multiple resistors based at least on the first multiple impedance values and the second multiple impedance values.

At 836, third multiple impedance values of respective second multiple resistors associated with a second barrier of the enclosure of the cell may be determined. For example, BMU 140 may determine third multiple impedance values of respective second multiple resistors associated with a second barrier of enclosure 520 of cell 410F. At 838, fourth multiple impedance values of the respective second multiple resistors may be determined. For example, BMU 140 may determine fourth multiple impedance values of the respective second multiple resistors.

At 840, second multiple impedance value changes of the respective second multiple resistors may be determined based at least on the third multiple impedance values and the fourth multiple impedance values. For example, BMU 140 may determine second multiple impedance value changes of the respective second multiple resistors based at least on the third multiple impedance values and the fourth multiple impedance values. At 842, it may be determined that at least a portion of the first multiple impedance value changes exceed a threshold impedance value change. For example, BMU 140 may determine that at least a portion of the first multiple impedance value changes exceed a threshold impedance value change.

At 844, it may be determined that at least a portion of the second multiple impedance value changes exceed the threshold impedance value change. For example, BMU 140 may determine that at least a portion of the second multiple impedance value changes exceed the threshold impedance value change.

At 846, it may be determined that the cell is compromised based at least on determining that the at least the portion of the first multiple impedance value changes exceed the threshold impedance value change and based at least on determining that the at least the portion of the second multiple impedance value changes exceed the threshold impedance value change. For example, BMU 140 may determine that cell 410F is compromised based at least on determining that the at least the portion of the first multiple impedance value changes exceed the threshold impedance value change and based at least on determining that the at least the portion of the second multiple impedance value changes exceed the threshold impedance value change.

At 848, the cell may be removed from a topology of the rechargeable battery. For example, BMU 140 may remove cell 410F from a topology of battery 145. In one or more embodiments, removing the cell from a topology of the rechargeable battery may be performed in response to determining that the cell is compromised. In one or more embodiments, removing the cell from the topology of the rechargeable battery may include configuring the rechargeable battery such that the cell is no longer actively charged and/or is no longer actively discharged. For example, removing the cell from the topology of the rechargeable battery may include configuring the rechargeable battery to electrically bypass utilizing the cell.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions of an operating system executable by the at least one processor;
   a rechargeable battery configured to provide electrical power to one or more components of the information handling system; and
   a battery management unit coupled to the battery;
   wherein the rechargeable battery includes a plurality of cells;
   wherein the battery management unit is configured to:
      determine a first plurality of impedance values of a respective first plurality of resistors associated with a first barrier of an enclosure of a cell of the plurality of cells of the rechargeable battery;
      determine a second plurality of impedance values of the respective first plurality of resistors;
      determine a first plurality of impedance value changes of the respective first plurality of resistors based at least on the first plurality of impedance values and the second plurality of impedance values;
      determine that at least a portion of the first plurality of impedance value changes exceed a threshold impedance value change;
      determine that the cell is compromised based at least on determining that the at least the portion of the first plurality of impedance value changes exceed the threshold impedance value change; and
      in response to determining that the cell is compromised, remove the cell from a topology of the rechargeable battery.

2. The information handling system of claim 1, wherein the battery management unit is further configured to:
   determine a third plurality of impedance values of a respective second plurality of resistors associated with a second barrier of the enclosure of the cell;
   determine a fourth plurality of impedance values of the respective second plurality of resistors;
   determine a second plurality of impedance value changes of the respective second plurality of resistors based at least on the third plurality of impedance values and the fourth plurality of impedance values; and
   determine that at least a portion of the second plurality of impedance value changes exceed the threshold impedance value change; and
   wherein, to determine that the cell is compromised, the battery management unit is further configured to determine that the cell is compromised further based at least on determining that the at least the portion of the second plurality of impedance value changes exceed the threshold impedance value change.

3. The information handling system of claim 1, wherein each of at least two resistors of the first plurality of resistors includes a resistive fabric that changes impedance when elongated along an axis.

4. The information handling system of claim 1, wherein, to remove the cell from the topology of the rechargeable battery, the battery management unit is further configured to reconfigure the topology of the rechargeable battery to bypass utilizing the cell.

5. The information handling system of claim 1, wherein the battery management unit is further configured to:
   in response to determining that the cell is compromised, remove at least one other cell of the plurality of cells from the topology of the rechargeable battery.

6. The information handling system of claim 1, wherein the battery management unit is further configured to:
   after removing the cell from the topology of the rechargeable battery, charge balance other cells of the plurality of cells.

7. The information handling system of claim 1, further comprising:
   at least one analog to digital converter coupled to the battery management unit;
   wherein the at least one analog to digital converter is configured to:
      convert a first plurality of analog signals respectively associated with the first plurality of resistors into first digital data that includes the first plurality of impedance values;
      provide the first data to the battery management unit;
      convert a second plurality of analog signals respectively associated with the first plurality of resistors into second digital data that includes the second plurality of impedance values; and
      provide the second data to the battery management unit;
   wherein, to determine the first plurality of impedance values, the battery management unit is further configured to receive the first data from the at least one analog to digital converter;
   wherein, to determine the second plurality of impedance values, the battery management unit is further configured to receive the second data from the at least one analog to digital converter; and
   wherein, to determine the first plurality of impedance value changes, the battery management unit is further configured to compare the first digital data with the second digital data.

8. A method, comprising:
   determining a first plurality of impedance values of a respective first plurality of resistors associated with a first barrier of an enclosure of a cell of a rechargeable battery that includes a plurality of cells;
determining a second plurality of impedance values of the respective first plurality of resistors;
determining a first plurality of impedance value changes of the respective first plurality of resistors based at least on the first plurality of impedance values and the second plurality of impedance values;
determining that at least a portion of the first plurality of impedance value changes exceed a threshold impedance value change;
determining that the cell is compromised based at least on the determining that the at least the portion of the first plurality of impedance value changes exceed the threshold impedance value change; and
in response to the determining that the cell is compromised, removing the cell from a topology of the rechargeable battery.

9. The method of claim 8, further comprising:
determining a third plurality of impedance values of a respective second plurality of resistors associated with a second barrier of the enclosure of the cell;
determining a fourth plurality of impedance values of the respective second plurality of resistors;
determining a second plurality of impedance value changes of the respective second plurality of resistors based at least on the third plurality of impedance values and the fourth plurality of impedance values; and
determining that at least a portion of the second plurality of impedance value changes exceed the threshold impedance value change;
wherein the determining that the cell is compromised is further based at least on the determining that the at least the portion of the second plurality of impedance value changes exceed the threshold impedance value change.

10. The method of claim 8, wherein each of at least two resistors of the first plurality of resistors includes a resistive fabric that changes impedance when elongated along an axis.

11. The method of claim 8, wherein the removing the cell from the topology of the rechargeable battery includes reconfiguring the topology of the rechargeable battery to bypass utilizing the cell.

12. The method of claim 8, further comprising:
in response to the determining that the cell is compromised, removing at least one other cell of the plurality of cells from the topology of the rechargeable battery.

13. The method of claim 8, further comprising:
after the removing the cell from the topology of the rechargeable battery, charge balancing other cells of the plurality of cells.

14. The method of claim 8,
wherein the determining the first plurality of impedance values includes converting, by at least one analog to digital converter, a first plurality of analog signals respectively associated with the first plurality of resistors into first digital data that includes the first plurality of impedance values;
wherein the determining the second plurality of impedance values includes converting, by the at least one analog to digital converter, a second plurality of analog signals respectively associated with the first plurality of resistors into second digital data that includes the second plurality of impedance values; and
wherein the determining the first plurality of impedance value changes includes comparing the first digital data with the second digital data.

15. A battery management unit, comprising:
at least one processor; and
a memory medium, coupled to the at least one processor, that stores instructions executable by the at least one processor, which when executed by the at least one processor, cause the battery management unit to:
determine a first plurality of impedance values of a respective first plurality of resistors associated with a first barrier of an enclosure of a cell of a rechargeable battery that includes a plurality of cells;
determine a second plurality of impedance values of the respective first plurality of resistors;
determine a first plurality of impedance value changes of the respective first plurality of resistors based at least on the first plurality of impedance values and the second plurality of impedance values;
determine that at least a portion of the first plurality of impedance value changes exceed a threshold impedance value change;
determine that the cell is compromised based at least on determining that the at least the portion of the first plurality of impedance value changes exceed the threshold impedance value change; and
in response to determining that the cell is compromised, remove the cell from a topology of the rechargeable battery.

16. The battery management unit of claim 15,
wherein the instructions further cause the battery management unit to:
determine a third plurality of impedance values of a respective second plurality of resistors associated with a second barrier of the enclosure of the cell;
determine a fourth plurality of impedance values of the respective second plurality of resistors;
determine a second plurality of impedance value changes of the respective second plurality of resistors based at least on the third plurality of impedance values and the fourth plurality of impedance values; and
determine that at least a portion of the second plurality of impedance value changes exceed the threshold impedance value change; and
wherein, to determine that the cell is compromised, the instructions further cause the battery management unit to determine that the cell is compromised further based at least on determining that the at least the portion of the second plurality of impedance value changes exceed the threshold impedance value change.

17. The battery management unit of claim 15, wherein each of at least two resistors of the first plurality of resistors includes a resistive fabric that changes impedance when elongated along an axis.

18. The battery management unit of claim 15, wherein, to remove the cell from the topology of the rechargeable battery, the battery management unit is further configured to reconfigure the topology of the rechargeable battery to bypass utilizing the cell.

19. The battery management unit of claim 15, wherein the battery management unit is further configured to:
in response to determining that the cell is compromised, remove at least one other cell of the plurality of cells from the topology of the rechargeable battery.

20. The battery management unit of claim 15, wherein the instructions further cause the battery management unit to:

after removing the cell from the topology of the rechargeable battery, charge balance other cells of the plurality of cells.

\* \* \* \* \*